May 19, 1925.
H. SYNCK
GEARING
Filed Aug. 5, 1922
1,538,524
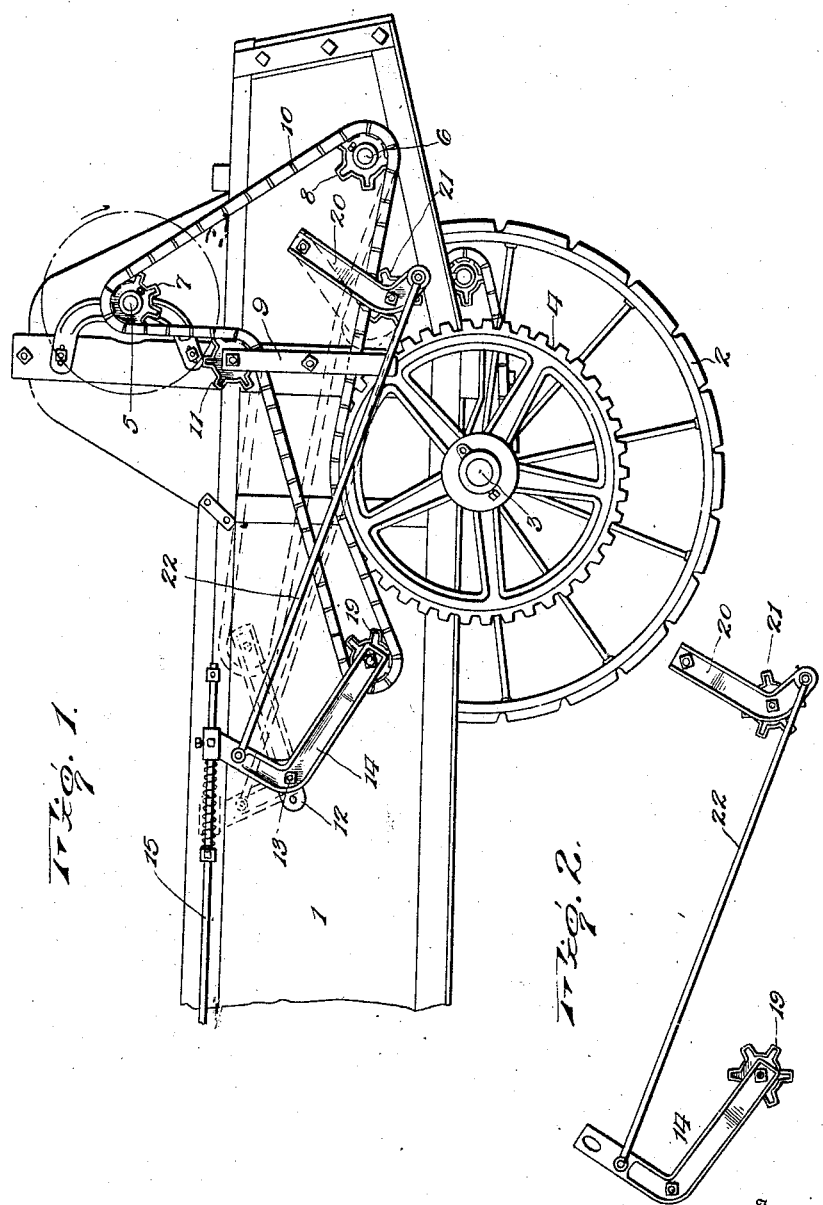
Inventor
Henry Synck.
By Lacey & Lacey, Attorneys Patented May 19, 1925.

1,538,524

UNITED STATES PATENT OFFICE.

HENRY SYNCK, OF COLDWATER, OHIO, ASSIGNOR TO THE NEW IDEA SPREADER CO., OF COLDWATER, OHIO, A CORPORATION OF OHIO.

GEARING.

Application filed August 5, 1922. Serial No. 579,888.

*To all whom it may concern:*

Be it known that I, HENRY SYNCK, a citizen of the United States, residing at Coldwater, in the county of Mercer and State of Ohio, have invented certain new and useful Improvements in Gearing, of which the following is a specification.

This invention relates to gearing particularly designed to drive the distributing cylinders or beaters of fertilizer distributers in which a sprocket chain or other flexible member is moved into or out of engagement with a driving sprocket or other rotary driving member so as to impart the desired rotation to the beaters or distributing cylinders. In the gearing for the stated purpose, the sprocket chain is trained around a plurality of idlers, one of which is carried by a shifting arm or lever which is pivotally mounted upon the side of the wagon box for movement in a vertical plane so that when the idler carried by said arm is in its lowered position the lower run of the chain will pass over and be in engagement with the driving sprocket so as to be set in motion as the wagon is drawn over the field. When the shifter arm is swung upwardly so as to raise said idler, the lower run of the chain is raised above the sprocket and will then remain at rest so that the machine may be drawn over a field without actuating the beaters. It has been found, especially on low down machines, that in order to raise the chain to such a degree that its lower run will not sag and rest upon the driving sprocket the shifting arm and the idler thereon must be raised above the side of the wagon body where it will interfere with the reloading of the wagon. The raising of the arm and the sprocket carried thereby to such an extent also prevents the employment of a hood or casing to enclose the gearing and prevent an accumulation of dust and dirt thereon which accumulation will interfere with the successful operation of the apparatus and also cause excessive wear upon the moving parts. The present invention seeks to provide means whereby, when the shifter arm is raised, the lower run of the driving chain or other flexible gear element will be effectually held against engagement with the driving sprocket without the idler being carried above the wagon body. Inasmuch as the idler in its highest position will be below the top edge of the wagon body, a casing may be fitted against the body so as to enclose the moving parts.

The stated object of the invention and other objects which will incidentally appear in the course of the following description are attained in such a mechanism as is illustrated in the accompanying drawings, and the invention resides in certain novel features which will be particularly pointed out in the claims following the description.

In the drawings—

Figure 1 is a side elevation of a chain and sprocket gearing embodying my improvements, the operative position of the parts being shown in full lines and the inoperative position being indicated by dotted lines;

Fig. 2 is a detail perspective view of the shifting arms.

The wagon body or box 1 may be of the usual form and dimensions and is supported at its rear end by ground wheels 2 carried by an axle 3. A driving sprocket wheel 4 is secured to the axle at the inner side of the wheel 2 and upon the ends of the upper and lower beater shafts 5 and 6, sprockets 7 and 8 are respectively secured. A bracket 9 is secured on the side of the wagon body in advance of the sprockets 7 and 8 and may be of any preferred form which will permit the upper and lower runs of the sprocket chain 10 to pass between the ends of the bracket and the side of the wagon box. An idler sprocket 11 is disposed between the upper end of this bracket and the side of the wagon box and the upper run of the chain is trained around and under said idler so as to be held in engagement with the sprocket 7 by which motion is transmitted to the upper beater. The sprocket 8 through which motion is imparted to the lower beater is disposed preferably slightly below the highest point of the driving sprocket 4 so that the lower run of the sprocket chain will be held taut when at work by its engagement with the driving sprocket and the said sprocket 8. In advance of the axle 3, I secure to the side of the wagon box a bracket or plate 12 having a lateral stud 13 projecting therefrom and upon the said stud is pivotally mounted the shifter lever 14, the short arm of said lever being turned upwardly and connected with a controlling rod 15 which extends to the front of the wagon to be manipulated in a well-known manner. The controlling rod 15 is adapted in the usual manner to shift the lever 14 about the pivot stud 13 engaging at its elbow so that the long arm of said lever will swing upwardly or downwardly as is usual in this type of machines. The shifter carries at the rear end of its long arm an idler sprocket 19, the forward bight of the sprocket chain 10 being trained around the said idler sprocket.

At a point above and in rear of the driving sprocket, I pivotally mount at the end of its long arm upon the side of the wagon box a second shifter or elbow lever 20 which depends below the adjacent lower run of the driving chain 10 and carries at its elbow an idler 21 which externally engages said run of the chain in rear of the driving sprocket. The lower extremity or short arm of this lever is connected by a link 22 with the upper or short arm of the forward shifter or elbow lever 14 so that the two arms will move simultaneously but swing in opposite directions.

It will be readily seen that, when the machine is in use distributing fertilizer, the travel of the wagon will cause rotation of the driving sprocket gear 4 which will in turn actuate the chain 10 and transmit motion therethrough to the beater shafts. When the load has been distributed or for any other reason it be desired to stop the operation of the beaters, the controlling rod 15 is drawn forward so that the shifter or elbow lever 14 will be swung about its pivot 13 and the idler 19 brought to the position shown in dotted lines in Fig. 1. The upward movement of the idler will obviously raise the forwardly extending portions of the chain and will lift the lower run out of mesh with the sprocket 4, the rear lever 20 obviously swinging the idler 21 upwardly and forwardly so that the chain will be lifted both in rear and in front of the main driving sprocket, as shown by the dotted lines in Fig. 1. Ordinarily, in the gearing as heretofore provided, the lower run of the sprocket chain would sag unless the idler 19 was drawn up so high as to stand above the bed or the chain were fitted so tightly to the several sprockets as to operate poorly and with excessive friction. With the present invention, however, that portion of the chain immediately over the driving member will be held out of contact with the said member in a slightly arched form notwithstanding the vibrations due to travel over a rough field or loosening in the chain caused by wear upon the links, and in order to hold the chain thus positively above and out of reach of the driving gear 4, it is not necessary to swing any of the parts above the wagon body. Hence there is no interference with the reloading. Moverover, an enclosing hood or casing which will not extend above the wagon body may be placed over the gearing so as to protect the same from scattered fertilizer or deposits of other matter which would tend to clog the operation. It will be noted that the elbow lever and the single arm lever together with the connecting rod are disposed entirely within the lines of the upper and lower edges of the wagon body so that said parts are, in effect, housed and protected thereby and liability of accidental disengagement of the sprocket chain 10 from the sprocket gear 4, which would occur if the parts projected below the bottom of the wagon body and in the path of an obstruction in the field, is thus effectually prevented.

It will be further noted that I attain the desired end by means which are exceedingly simple in construction and arrangement and will not add materially to the cost of the machine nor interfere in any way with the successful operation of the gearing when the machine is in use.

It will also be readily understood that the higher the levers are swung, the tighter the chain will be drawn so that elongation of the chain due to wear will be counteracted automatically and the chain will be supported out of contact with the driving gear.

Having thus described the invention, what is claimed as new is:

1. In a manure spreader, the combination with a wagon body including spaced beater shafts, of a driving gear member, sprocket wheels secured to the beater shafts, a sprocket chain engaging the driving gear member and trained around said sprocket wheels, an elbow lever pivotally mounted on one side of the wagon body forward of the driving gear member and provided with arms of different lengths, a single arm lever pivotally mounted on the same side of the wagon body at the rear of the driving gear member, a sprocket idler pivotally mounted on the long arm of the elbow lever and engaging the bight in the sprocket chain, another sprocket idler pivotally mounted between the ends of the single arm lever and engaging the outer side of the lower run of the sprocket chain, a rod forming a direct positive connection between the short arm of the elbow lever and the lower end of the single arm lever, and operating means connected with the short arm of the elbow lever whereby said levers may be swung simultaneously to disengage the sprocket chain from the driving gear member, the levers, connecting rod and lower run of the sprocket chain being disposed wholly within the lines of the upper and lower edges of the wagon body when the levers are in both normal and tilted positions.

2. In a manure spreader, the combination with a wagon body including spaced beater shafts, of a driving gear member, sprocket wheels secured to the beater shafts, a sprocket chain engaging the driving gear member and trained around said sprocket wheels, a lever pivotally mounted on one side of the wagon body above and forward of the driving gear member, a second lever pivotally mounted on the same side of the wagon body above and at the rear of the driving gear member, a sprocket idler pivotally mounted on the lower end of the first-mentioned lever and engaging the bight of the sprocket chain, a sprocket idler pivotally mounted between the ends of the second lever and engaging the outer side of the lower run of the sprocket chain, a rod forming a direct positive connection between the upper end of one of said levers and the lower end of the other lever beneath the sprocket idler carried thereby, and a controlling rod extending longitudinally of the wagon body near the upper edge thereof and operatively connected with the adjacent end of the first-mentioned lever whereby said levers may be swung simultaneously to disengage the sprocket chain from the driving gear member and support said sprocket chain in elevated position above said driving gear member, the levers, connecting rod and lower run of the sprocket chain being disposed wholly within the lines of the upper and lower edges of the wagon body when the levers are in both normal and tilted positions.

In testimony whereof I affix my signature.

HENRY SYNCK. [L. S.]